March 31, 1942.  B. S. WATLING  2,278,007
COIN CONTROLLED AMUSEMENT APPARATUS
Filed May 27, 1940  3 Sheets-Sheet 1
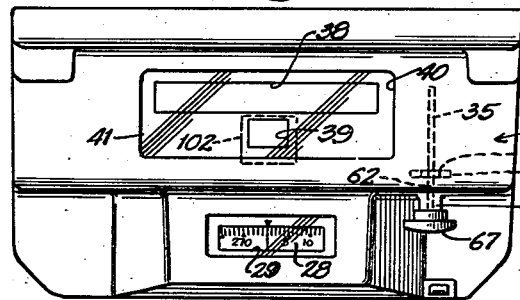
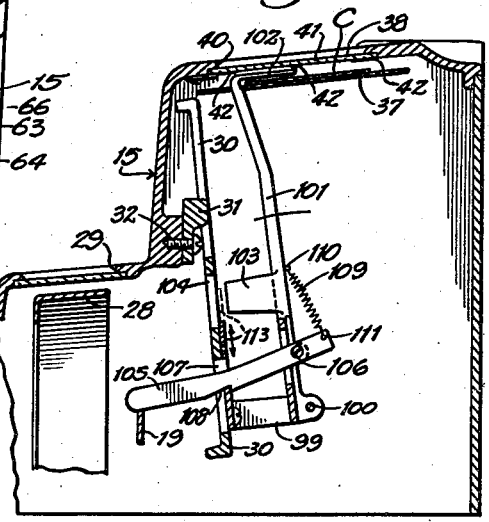
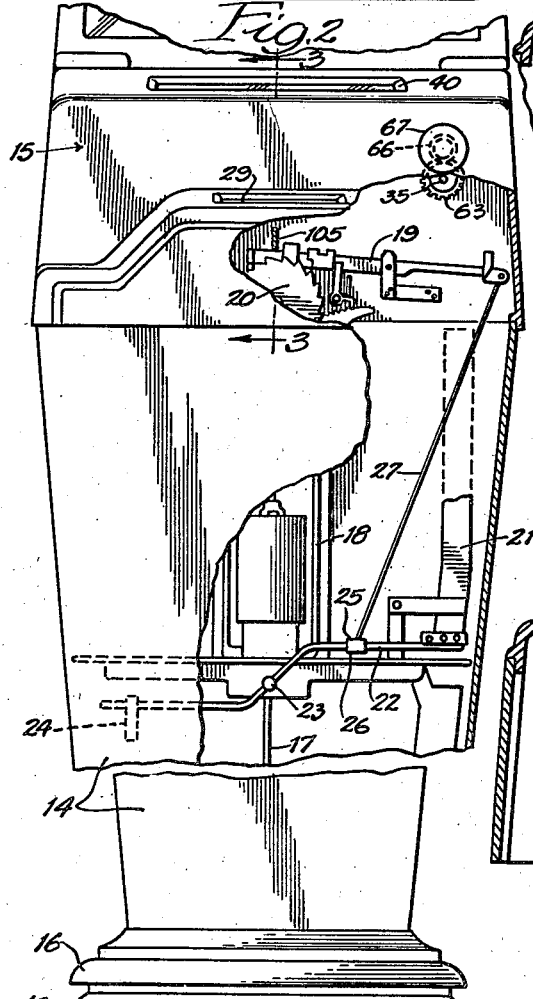
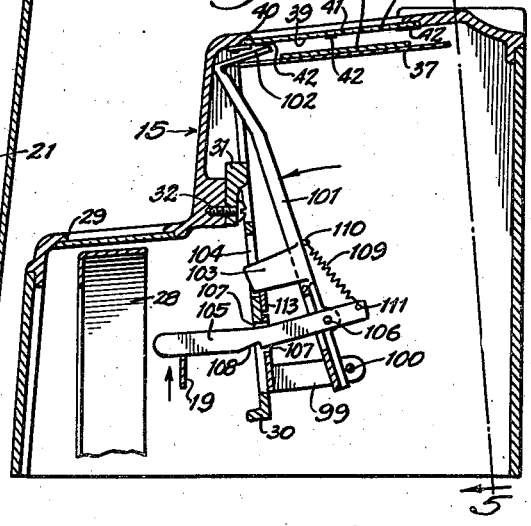
Inventor:
Burns S. Watling,
By Soans, Pond & Anderson,
Attorneys.

March 31, 1942. B. S. WATLING 2,278,007
COIN CONTROLLED AMUSEMENT APPARATUS
Filed May 27, 1940 3 Sheets-Sheet 2
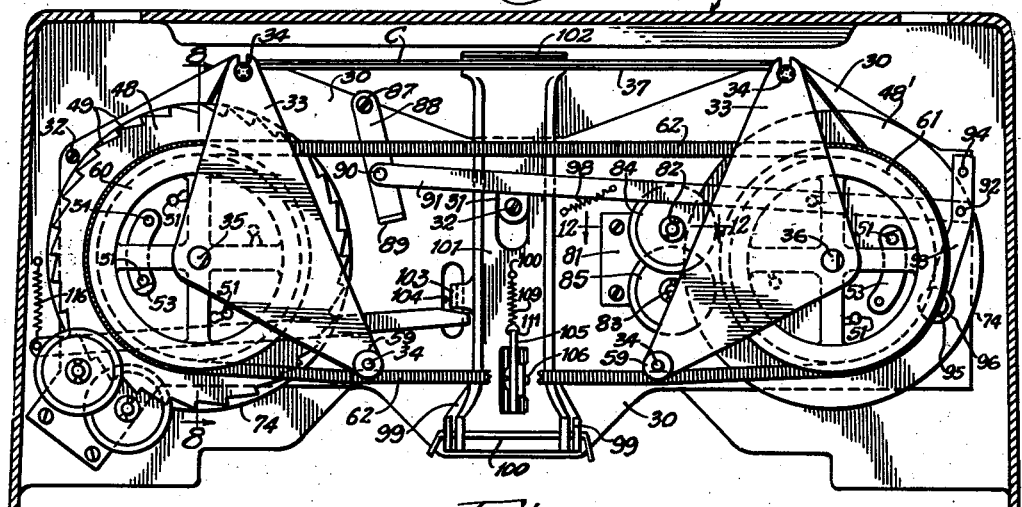
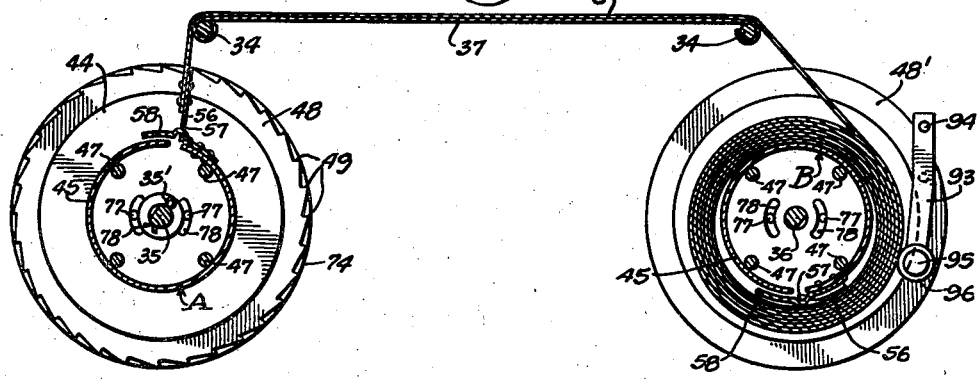
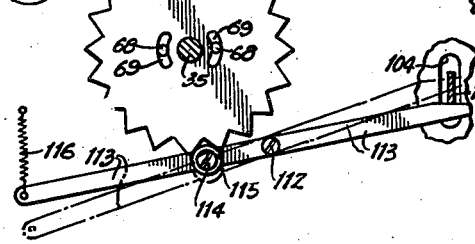
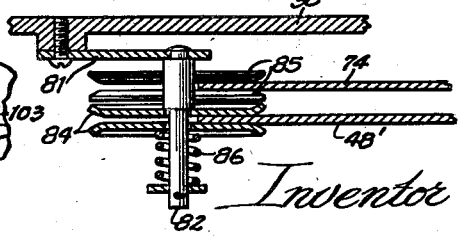
Inventor
Burns S. Watling,
By Soane, Pond & Anderson,
Attorneys.

March 31, 1942.  B. S. WATLING  2,278,007
COIN CONTROLLED AMUSEMENT APPARATUS
Filed May 27, 1940   3 Sheets-Sheet 3
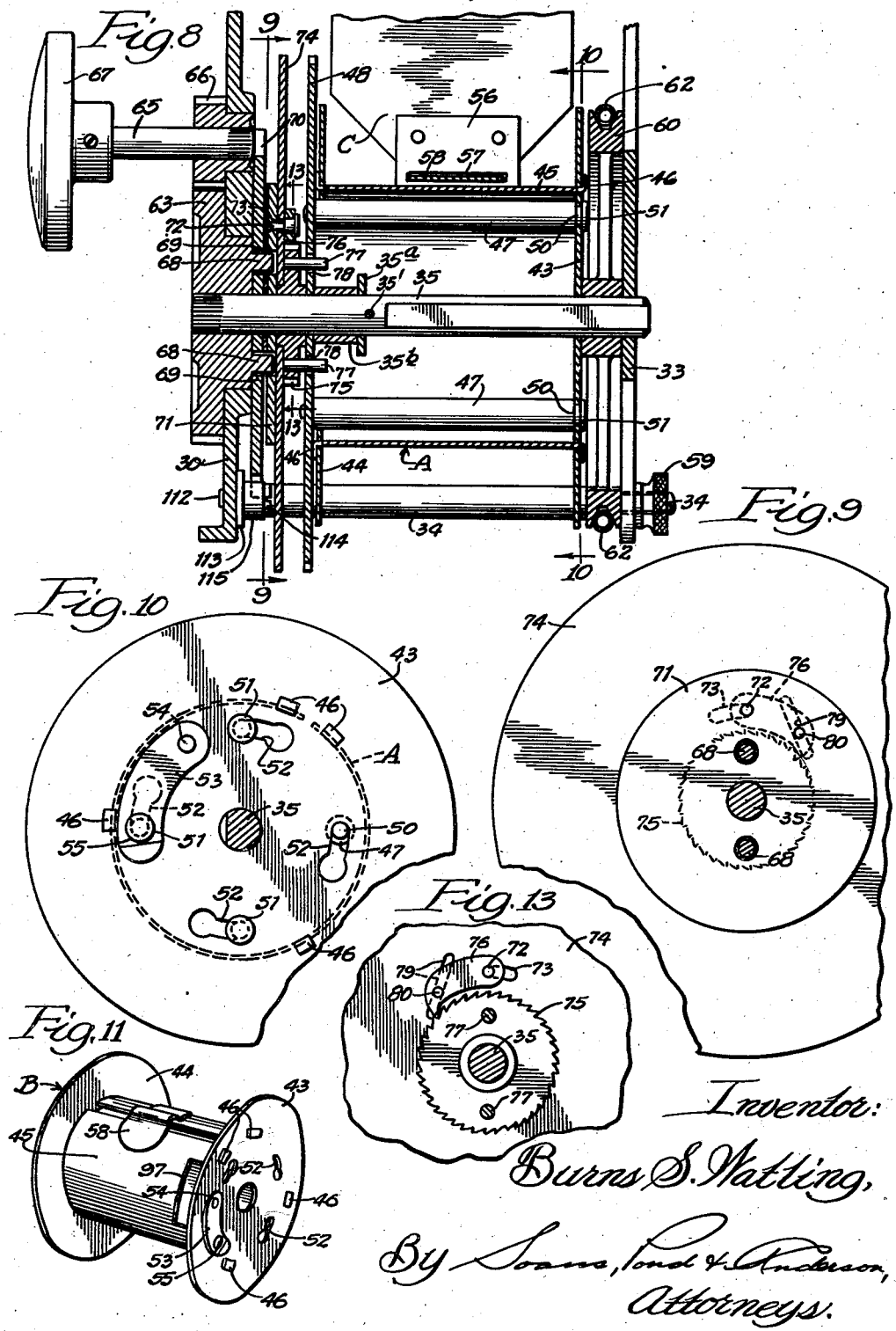

Patented Mar. 31, 1942

2,278,007

UNITED STATES PATENT OFFICE 2,278,007

COIN CONTROLLED AMUSEMENT APPARATUS

Burns S. Watling, Chicago, Ill., assignor to Watling Scale Company, Chicago, Ill., a corporation of Illinois Application May 27, 1940, Serial No. 337,404

11 Claims. (Cl. 40—86)

This invention pertains to coin controlled amusement apparatus of a general type disclosed in Letters Patent to Thomas W. B. Watling, No. 1,923,287 granted August 22, 1933, and in Letters Patent to Burns S. Watling No. 2,124,838, granted July 26, 1938. In the said patents a fortune telling mechanism is combined in a single apparatus with a weighing scale, both being controlled by a common coin-actuated means.

My present invention relates solely to the coin-controlled fortune telling apparatus, although I have herein shown the same combined with a weighing scale substantially identical with that disclosed in the aforementioned patents. But the invention may be used independently of any weighing scale.

The main object of the present invention has been to improve and simplify the fortune telling apparatus of my aforesaid Patent No. 2,124,838, the improvements relating mainly to the shutter and shutter actuating mechanism which cooperate with a sight opening through which the answers to the questions disclosed are made visible on deposit of a proper coin; and to the structure of the drums and drum mountings on which the band carrying the questions and answers is mounted.

An illustrative embodiment of the invention is presented in the accompanying drawings, in which—

Fig. 1 is a top plan view of a combined weighing and fortune telling machine embodying the present improvements.

Fig. 2 is a front elevation of the same, broken off at its upper end and broken out between its ends, and having the front wall of its casing broken out to disclose internal parts.

Fig. 3 is an enlarged vertical front-to-rear section viewed on the line 3—3 of Fig. 2.

Fig. 4 is a view similar to Fig. 3, but showing the shutter in retracted position in which it uncovers the sight opening through which the answers are visible.

Fig. 5 is a side-to-side substantially vertical section, viewed on the line 5—5 of Fig. 4.

Fig. 6 is a vertical section through the winding drums and the band that is wound back and forth therebetween.

Fig. 7 is a detail elevation of a star wheel cam and a shutter closing lever actuated thereby.

Fig. 8 is a vertical axial section through one of the winding drums and its manually operated actuating mechanism, viewed on the line 8—8 of Fig. 5.

Fig. 9 is a vertical section taken on the line 9—9 of Fig. 8.

Fig. 10 is an end elevation of one of the winding drums, viewed on the line 10—10 of Fig. 8.

Fig. 11 is a perspective elevation on a reduced scale of one of the winding drums.

Fig. 12 is a sectional detail of a pair of friction drags, taken on the line 12—12 of Fig. 5.

Fig. 13 is a vertical section taken on the line 13—13 of Fig. 8.

First briefly describing parts that are old and are more fully described in the aforesaid patents, the frame or casing comprises a base 13, an upright portion 14 and an upper portion or cap 15. The scale platform 16 is connected through a rod 17, a yoke 18, and other connections (not shown) to a pair of pivotally suspended pendulum weights that counter balance the weight on the platform and are normally locked against swinging movement by a dogging lever 19 engaged with a ratchet wheel 20. 21 designates the coin chute, across the lower end of which lies one end of a lever 22 pivoted at 23 and carrying on its other end an adjustable counter weight 24. The lever 23 is delicately poised to close the lower end of chute 21, and, when struck by a falling coin, rocks and discharges the coin; and at the same time a loop or eye 25 on the lever strikes a foot 26 on the lower end of a link rod 27 that is suspended from the outer end of lever 19 and passes through the loop or eye 25, thus unlocking the weighing mechanism. The latter, when operated, rotates a scale disc 28 (Fig. 1), the scale of which is visible through a central opening 29 in the front top wall of the casing cap 15.

The amusement or fortune telling apparatus, in which the novel features of the present invention reside, is mounted in the upper rear part of the cap or top portion 15 of the casing. Attached to the inner side of the front wall portion of the cap 15 is a mounting frame for most of the movable parts, consisting of a single front plate 30 secured by a bracket lug 31 and screws 32 to the front wall, a pair of independent triangular rear plate 33 parallel with said front plate, and connecting and spacing bolts 34. Journaled in and between the frame plates 30 and 33 are a pair of shafts 35 and 36, on which are loosely mounted a pair of drums designated as entireties by A and B (Fig. 6), and attached at its ends to, and wound back and forth between these drums, is a long flexible band C that also passes over a flat sheet metal support 37 extending between and at its ends curled around the upper pair of tie bolts 34. This support 37 defines a flat horizontal stretch of the band, as clearly shown in Figs. 5 and 6. The band C carries a rear row or series of questions disposed side by side lengthwise of the band which are exposed to view through an elongated sight opening 38 (Fig. 1) in the rear top wall of the cap 15, and it also carries a front row or series of answers, each occupying the central portion of the same space lengthwise of the band as one of the questions, which, as the band is moved, are brought into register one at a time with a short sight opening 39 (Fig. 1) that is laterally opposite the central portion of the question view opening 38. As best shown in Figs. 3 and 4, the two view openings 38 and 39 may be, and preferably are, formed by securing to the under side of a single rectangular opening 40 a glass plate 41 entirely covering the opening 40 and having on its under side an opaque paint indicated at 42 so applied as to define the transparent openings 38 and 39. This is a somewhat simpler and cheaper mode of defining the separate openings 38 and 39 than by forming them separately in and through the top plate of the cap 15.

The band winding mechanism is substantially the same as that disclosed in my former Patent No. 2,124,838. The drum A is turned by a manually operated knob or crank, and the two drums are interconnected by a belt and pulley drive of special construction (later described), including means by which either drum may function as the winding member and may, through the band, rotate the other drum functioning as the unwinding member, a light friction drag being applied to both drums to keep the band taut; and the driving members of the two drums are drivingly connected to the latter by means which automatically disengage the drive of the unwinding drum when the drive of the winding drum is engaged, so as to take care of the varying angular movements of the two drums as the effective diameters of the latter change when winding the band from one drum onto the other.

Describing the drums, which are of identical structure, and referring mainly to Figs. 8 to 11, each drum consists of a rear head 43 that is centrally apertured to have a bearing fit on the shaft 35 or 36, a front head or annulus 44, and a cylindrical body member 45. This cylindrical body member is formed on its ends with spaced projecting lugs or fingers 46 that are passed through narrow slots in the heads 43 and 44 and then bent down against the outer sides of said heads. The drum thus formed is removably mounted on a drum support or carrier preferably taking the form of a circular group of rods 47 that, at their front ends, are permanently mounted in a plate preferably made as a disc 48, the disc 48 pertaining to drum A having peripheral ratchet teeth 49. The other ends of the rods 47 are each formed with a neck 50 and a head 51, and the drum head 43 is formed with a corresponding group of key-hole slots 52 (Fig. 10). The head 43 is applied to the rods 47 by entering the heads 51 through the circular portions of the key-hole slots, and the head 43 is then turned slightly to bring the necks 50 into the narrow portions of the key-hole slots. To lock the head 43 against accidental backturning, a guard strip 53 is riveted at one end at 54 to the outer side of the drum head 43 and is formed in its other end with a hole 55 of sufficient size to fit down over the head 51 of one of the rods 47. A cotter pin 35′, a washer 35a and a spacing sleeve 35b (Fig. 8) confine the disc 48 against lateral movement inwardly along shaft 35.

The lugs or fingers 46 securely lock the cylindrical body 45 against any endwise movement relatively to the heads 43 and 44. The end of the band C has riveted thereto a tab 56 which is provided with a slot 57 that engages with a metal tongue 58 attached to the drum body 45. Also, for greater convenience in removing the frame plate 33 and the drum from the rods 47, the tie bolts 34 have threaded ends engaged by knurled thumb nuts 59 (Fig. 8) which are readily applied and backed off without requiring the use of a wrench.

Fast on the inner ends of the shafts 35 and 36 are grooved pulleys 60 and 61 connected by an endless belt 62 that consists of an elastic wire coil that is stretched over the pulleys under enough tension to develop sufficient friction to drive either drum from the other during normal band winding operations, but will slip on the pulleys when the band has been fully unwound from drum A to prevent a breaking strain being imparted to the band if the winding movement of drum B should be continued beyond that point.

To wind the band in either direction manual power is applied to the shaft 35. Referring to Fig. 8, keyed on the outer end of shaft 35 is a gear 63, the hub of which is journaled in a bearing in the frame plate 30. Journaled in a bearing boss 64 (Fig. 1) on the front wall of the cap 15 is a shaft 65, on the inner end of which is keyed a pinion 66 meshing with and driving the gear 63; the hub of pinion 66 being also journaled in the frame wall 30. On the outer end of shaft 65 is a manually operable knob 67. On the inner face of the hub of gear 63 are a pair of pins 68 that extend through arcuate slots 69 (Fig. 7) of a star wheel cam 70 that is journaled on shaft 35 and lies next to the hub of gear 63 and its bearing. The pins 68 extend into holes in a pawl carrier disc 71 (Fig. 9) that is journaled on the shaft 35 next to the cam 70; and mounted in the disc 71 is a pawl shaft 72 that extends through a short arcuate slot 73 in a friction disc 74 that is rotatably mounted on the hub of a ratchet 75 journaled on the shaft 35. Pivoted on the inner end of the pawl shaft 72 is a pawl 76, the nose of which is adapted to drivingly engage the ratchet 75, as shown in Fig. 13. The ratchet 75 in turn carries a pair of short pins 77 that extend through arcuate slots 78 (Fig. 6) in the disc 48. In the friction disc 74 is formed a cam slot 79 (Figs. 9 and 13) that is engaged by a lateral pin 80 on the side of the pawl 76.

In the case of the drum B, the drive of the drum is from its pulley 61 and shaft 36 to the disc 48′ (Fig. 5) that corresponds to the disc 48 of the drum A through a pawl and ratchet lost motion drive similar to the above described in connection with drum A. This drive of drum B from drum A is fully shown and described in my aforesaid Patent No. 2,124,838, and more especially Fig. 7 thereof; and for that reason is not repeated here.

To render the above described means for throwing the pawls 76 into and out of working engagement with their respective ratchets 75, it is necessary to apply a friction drag to the friction discs 74. Also, to maintain the band taut as it is wound back and forth between the two reels, it is necessary to apply a light drag to the unwinding reel. To fulfill these offices, I employ in association with each drum a pair of friction drags which, in the instance shown, take the form of ordinary sewing machine tensions. Referring to Figs. 5 and 12, mounted on a bracket 81 attached to the inner side of the frame plate 30 are a pair of relatively off-set shafts 82 and 83 on which are slidably mounted clamp discs 84 and 85 embracing the peripheral portions of the disc 48 or 48' and the friction disc 74, respectively and pressed into clamping engagement by a spring 86. This friction drag is identical with that disclosed in my Patent No. 2,124,838.

By reason of the above described drives, each pawl 76 undergoes a limited body movement as its nose is thrown into or out of engagement with its cooperating ratchet by the cam slot 79 and pin 80, so that, when the winding of the band is reversed, the pawl of the unwinding drum is drawn out of engagement with its ratchet before the pawl of the winding drum is thrown into engagement with its ratchet, thus avoiding any breaking strain on the band. As the band is wound on one drum it idly rotates the other drum, being maintained taut by the friction 84; and the friction drag on the discs 74 by the friction 85 ensures the cooperation of the pins 80 and their cam slots 79 in applying and retracting the pawls.

Since the drum A is positively driven during its band winding movement by and from the knob 67, I have provided an automatic detent device to arrest such band winding movement when the band has been entirely unwound from drum B, in order to prevent possible rupture of the band by a further winding movement of drum A. This device is also taken from a similar device disclosed in my former patent aforesaid, with a slight modification to adapt it to a drum instead of a reel. Referring to Figs. 5, 6 and 11, pivoted at 87 on the frame plate 30 is a depending dog 88 having a lateral tooth 89 on its lower end that cooperates with the peripheral ratchet 49 of the disc 48 of drum A. Pivoted to the dog 88 at 90 is a link bar 91, the other end of which is pivoted at 92 to a depending lever 93 hung from a pivot 94 in the frame plate 30 and carrying on its lower end a lateral stud 95 on which is journaled a roller 96. As shown in Fig. 11, the body 45 of the drum B is formed with a segmental depression 97 that lies in the path of the roller 96. A pull spring 98 anchored at one end to the frame plate and at its other end to the link 91 maintains the roller 96 in rolling engagement with the portion of the band wound on the drum B, the tooth 89 of dog 88 being held out of engagement with the ratchet teeth 49 so long as the roller 96 is engaged with the unwinding roll of the band on drum B. The instant, however, the roller 96 rides off the end of the band and drops into the depression 97 of the drum body, the spring 98 shifts the parts to the left, viewing Fig. 5, carrying the tooth of the dog 88 into engagement with the ratchet teeth 49, which locks drum A against further band winding movement. When the direction of drive of the band is reversed, the roller 96 is forced out of the depression 97, and this retracts the dog 88 from the ratchet teeth 49. It is not necessary to apply a similar detent device to the drum B, because that drum is driven by the belt 62, and if the winding movement of the drum B is carried too far, so as to create a pull on band C when the latter can travel no further, belt 62 will slip on the pulleys before the tension on the band is sufficient to rupture the latter.

The present invention includes an improve and simplified shutter mechanism by which the answer sight opening 39 is covered on the initial turning movement of the knob 67 and, on the deposit of a coin, is exposed to view. This mechanism is shown in Figs. 1 to 5 inclusive, 7 and 8. On the rear side of the lower portion of the frame plate 30 is a rearwardly extending forked bracket 99, between the arms of which is pivoted on a pin 100 the lower end of an upstanding arm 101 that carries on its upper end a rectangularly bent shutter plate 102 that moves forwardly and rearwardly across the answer sight opening 39. Arm 101 and its shutter 102 are biased by gravity to the open position shown in Fig. 4. On one edge of the arm 101 is an integral forwardly extending lug 103 that registers with a slot 104 in the frame plate 30. When the arm 101 and its shutter 102 are in the closing position shown in Fig. 3, they are locked in such position by a latch bar 105 that is pivoted at 106 on the upright arm 101 and extends through and beyond a lower slot 107 in the frame plate 30, and on the lower edge of the latch bar 105 is a notch 108 that normally engages with the lower edge of the slot 107 under the urge of gravity and a pull spring 109 anchored at 110 to the back of the arm 101 and connected at 111 to the rear end of the latch bar 105. Pivoted at 112 (Fig. 7) to the frame plate 30 is a lever 113 lying on the outer side of the plane of the star wheel cam 70, as shown in Fig. 8, and this lever carries a pin 114 on which is journaled a roller 115 that is urged upwardly in contact with the teeth of the cam 70 by a pull spring 116. The other end of lever 113 lies beneath and crosswise of the lug 103 on the arm 101. As shown in Figs. 2, 3 and 4, the inner end of the coin-actuated trip lever 19 extends crosswise of and beneath the latch bar 105.

A cycle of operation of the apparatus may be briefly described as follows:

With the parts in the unlocked and shifted position shown in Fig. 4 (which is the position in which the parts have been left by its previous operation), the next person using the apparatus stands on the platform and first, by turning the knob 67, rotates the cam 70, (in one direction or the other). This raises the end of lever 113 that, at that time, underlies the lug 103, so that the initial turning movement of the knob shifts the arm 101 and its shutter 102 to the position shown in Fig. 3, thus occluding the answer opening 39. This also causes the latch 105 to drop, under the urge of gravity and spring 109, into the locking position shown in Fig. 3. Continued turning of the knob to any extent in either direction starts the band movement and brings the desired question opposite the then closed answer opening without disturbing the set position of the parts as shown in Fig. 3, since the lever 113 can then rise and fall idly past the inner end of lug 103, as shown by dotted lines in Fig. 3. Said next person then drops a coin in the chute. This releases the weight indicating mechanism by tilting the weight detent lever 19 out of engagement with the ratchet wheel 20, thus showing the user his weight, and at the same time the detent lever 19 raises the latch 105 out of locking position (Fig. 4), so that the arm 101 and its shutter 102 drop back by gravity to the position shown in Fig. 4, fully exposing the answer opening 39.

The lost motion drive between the ratchets 75 and their respective drums (represented by the pins 77 and the arcuate slots 78 in the discs 48 and 48') is not indispensable to the operativeness of the apparatus, but is preferably employed because it delays the band movement until after the answer opening has been fully occluded by the movement of the shutter to its locked position, so that no free answers to new questions are obtainable.

Although but one specific embodiment of this invention has been herein shown and described, I wish it to be understood that details of the constructions shown may be modified, without departing from the principle of the invention as defined by the appended claims.

I claim:

1. In an apparatus of the class described having a band supporting and winding mechanism, including a pair of drums on and between which the band is wound, a drum mounting comprising a shaft, a plate on said shaft, a circular group of rods secured at one end to said plate and encircling said shaft, and a drum formed with a cylindrical body and a head slidable over said group of rods and a head slidable on said shaft, said last named head having a circular group of key-hole slots, and the other ends of said rods having heads of a size to pass through the circular portions of said slots and necks of a size to engage with the narrow portions of said slots under a relative turning movement of said last named drum head and group of rods.

2. In combination with the subject-matter defined in claim 1, means mounted on the last named drum head and cooperating with one of the circular group of rods preventing accidental back turning of said drum head when the latter has been interlocked with the group of rods.

3. In combination with the subject-matter defined in claim 1, a guard strip mounted on the last named drum head and having a hole encircling the head of one of the circular group of rods to prevent accidental back turning of said drum head when the latter has been interlocked with the group of rods.

4. In an apparatus of the class described having a band supporting and winding mechanism, including a pair of parallel shafts, and drums respectively mounted on said shafts on and between which drums the band is wound, shaft supporting means comprising a frame plate in which corresponding ends of both shafts are mounted, a pair of independent frame plates parallel with and spaced from said first mentioned frame plate in which the other ends of said shafts are respectively mounted, and bolts connecting and spacing said first mentioned frame plate and each of said independent frame plates, whereby either of said independent frame plates may be removed without disturbing the other.

5. In an apparatus of the class described including a casing having a sight opening in a wall thereof, a band movable adjacent said opening and carrying indicia visible through said opening, means for moving said band, shutter mechanism comprising an upright arm pivoted at its lower end and carrying on its upper end a shutter movable across said sight opening, said arm and shutter being biased to a position uncovering said opening, and means actuated by the aforesaid band moving means for swinging said arm and shutter to a position covering said opening.

6. In combination with the subject-matter defined in claim 5, a latch member automatically operating to hold the arm and shutter in opening covering position.

7. In combination with the subject-matter defined in claim 5, a latch member automatically operating to hold the arm and shutter in opening covering position, and means for releasing said latch member.

8. In an apparatus of the class described including a casing having a sight opening in a wall thereof, a band carrying indicia visible through said opening, means for moving said band, shutter mechanism comprising an upright arm pivoted at its lower end and carrying on its upper end a shutter movable across said sight opening, said arm and shutter being biased to a position uncovering said opening, a laterally projecting lug on said arm, a star cam rotatable in either direction by the aforesaid drum turning means, a lever carrying a roller cooperating with said cam, said lever having an arm thereof lying crosswise of and beneath said lug, and a spring acting through said lever to press said roller against the periphery of said cam; said parts being so organized that when said lever is rocked by said cam it lifts said lug and thereby swings said arm and shutter to a position covering said opening.

9. In combination with the subject-matter defined in claim 8, a pivoted latch member automatically operating, when the arm and shutter are swung to opening covering position, to lock them in said position, and a lever for raising and releasing said pivoted latch member.

10. In an apparatus of the class described having a band supporting and winding mechanism, including a pair of horizontal drums on and between which the band is wound, a drum mounting comprising a horizontal shaft, a plate rotatable on said shaft, means confining said plate against lateral movement lengthwise of said shaft, a drive for said plate, a circular group of rods secured at one end to said plate and encircling said shaft parallel with the latter, and a drum formed with a hollow cylindrical body and a head slidable over said group of rods and a head slidable on said shaft, said last named head and the other ends of said rods having means separably interlocking them with each other.

11. In an apparatus of the class described having a band supporting and winding mechanism, including a pair of horizontal drums on and between which the band is wound, a drum mounting comprising a horizontal shaft, a plate rotatable on said shaft, means confining said plate against lateral movement lengthwise of said shaft, a drive for said plate, a circular group of rods secured at one end to, and projecting laterally of, said plate around and parallel with said shaft, and a hollow drum slidable endwise over said group of rods, said drum comprising a hollow cylindrical body encircling said group of rods, an annular head encircling one end of, and slidable over, said group of rods and secured to one end of said body, and a head secured to the other end of said body, said last named head and the other ends of said rods having means separably interlocking them with each other.

BURNS S. WATLING.